United States Patent Office 3,079,941
Patented Mar. 5, 1963

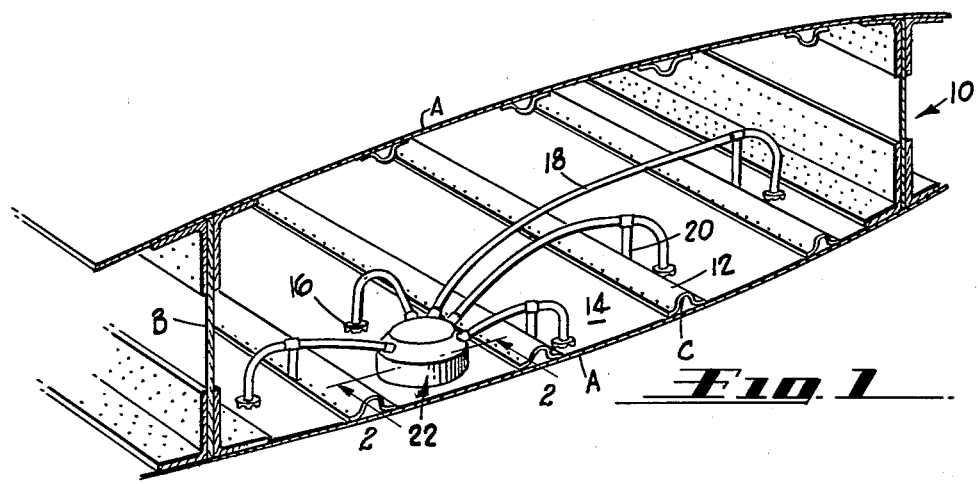
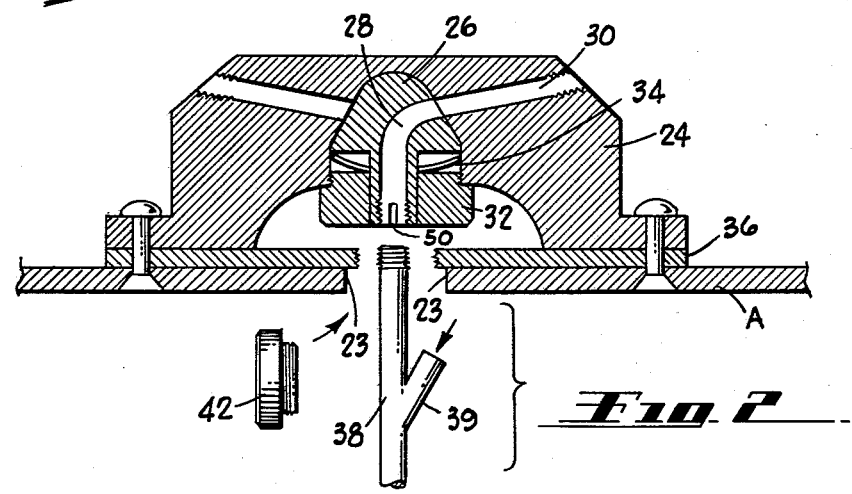
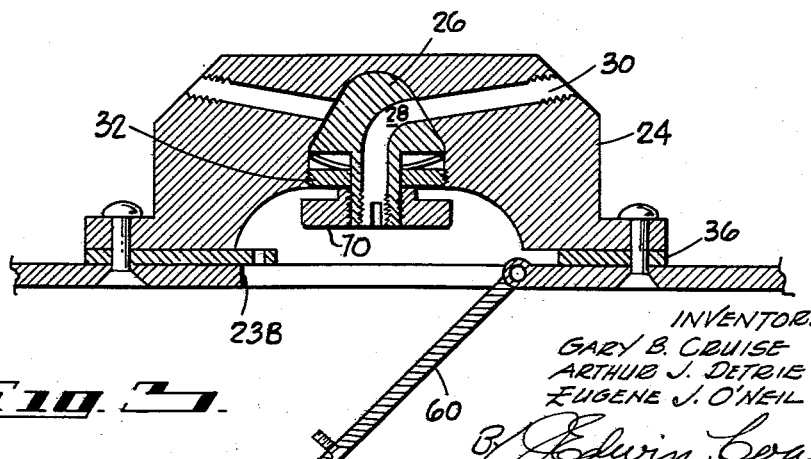

3,079,941
FUEL TANK DRAIN SYSTEM
Gary B. Cruise, Long Beach, Calif., Arthur J. Detrie, Ruston, La., and Eugene J. O'Neil, Canoga Park, Calif., assignors to Douglas Aircraft Company, Inc., Santa Monica, Calif.
Filed Dec. 28, 1959, Ser. No. 862,181
6 Claims. (Cl. 137—266)

This invention has to do with liquid-containing tanks, particularly fuel-containing tanks in aircraft.

Because of water vapor condensation therein, for one reason, such tanks ordinarily contain, not pure fuel, but a fuel layer resting atop a heavier layer of water. Since aircraft fuel tanks are usually integral with the wing or fuselage structure, they are outlined and defined by longitudinal and transverse structural members covered with the aircraft skin. As a consequence, between the stringers, ribs, doublers or the like there occur areas or loci, designated "low spots," that are lower than others. The water, overlain by the fuel, invariably accumulates in these low spots.

For one reason or another, contemporary aircraft fuel tank drainage systems, purporting to drain out the water, before flight, preferably, actually do not do so to the requisite extent.

Subject invention provides means that, in a few seconds of the aircraft's grounded time, drain all trapped water from all low spots in an aircraft integral fuel tank. Among the consequences may be mentioned the facts that "down" time of the aircraft for repair of structure weakened by water corrosion, is substantially eliminated and the time necessary to prepare the tank for entry by an inspector is materially shortened.

The lift-reducing weight-penalty arising from carrying the quite material volume of water found in the usual tank is obviated, since no water at all now need be carried; instead, this space can be entirely occupied by fuel. In short, the tank will contain nothing but fuel.

To these, and other, ends this invention combines with each of the low spots in an aircraft's integral fuel tank, whether in the wing or elsewhere, a conduit leading onwardly or outwardly therefrom; a single, substantially central and closable outlet-opening in the lower skin forming a wall of the tank; and indexable outlet-flow controlling means mounted in said opening and selectively communicable with said conduits to enable successive draining of the low spots. If there is an insufficient amount of liquid in the tank to create a hydrostatic "head" adequate to cause gravity outflow, this outlet flow-controlling means may be associated with an exterior conduit communicating with means combined therewith such as an aspirator or a suction pump for creating an air-pressure differential between the air in the tank and the low air pressure or partial vacuum in the exterior conduit.

The indexable valve may bear numerals corresponding to those given to respective low spots and may be selectively turned to make these numerals register with a zero point to successively drain successive low spots.

Other objectives and accomplishments of the invention will either be made manifest hereinafter, or become apparent as this disclosure proceeds.

By way of example, and merely to render the invention's concepts more concrete, the presently-preferred constructional embodiment thereof is representationally illustrated in the accompanying drawings and is described hereinafter in conjunction with these drawings. However, the invention itself resides in the matters defined in and by the annexed claims.

In these drawings,

FIG. 1 is a fragmentary perspective view of an aircraft fuel tank built integrally with a wing, through employment of the wing-framework, skins, etc.;

FIG. 2 is a vertical, substantially central section, on line 2—2 of FIG. 1, of one of the present selector valve and associated plug, and pump-pipe, and FIG. 3 is a similar view of another species of such valve.

The representational embodiment shown in FIG. 1 comprises a fuel tank integral with a wing 10 of an aircraft and defined by skins A fastened to a framework that includes spars B, stringers C and ribs, not shown.

At the bottom of such tanks, on the interior surface of the lower skin, various structural elements, such as the stringers C, define "high spots" and encompass between them the "low spots" 14, or depressed areas lower than others.

For successively draining all liquids out of these depressed areas, this invention provides, first, at least one suction or pick up head, 16, for each such low region. Heads 16 constitute the outward, or distal, termini of flexible conduits 18, preferably made of a material non-corrodible by, or inert to, gasoline, kerosene and acidulated, or the like, water, and to the other possible contents of such tanks. Each conduit 18 is supported, intermediate its ends, by a non-corrodible bracket 20.

The conduits all terminate at their proximal end in a selector valve 22, mounted interiorly of, and concentric with, threaded opening 23 located more or less centrally of the tank in the lower skin, 23 being openably closable by a fluid-tight plug 42.

Valve 22 comprises a header or housing 24 and a rotatable valve core 26 of the pet cock type. Core 26 includes a single substantially central bore 28 angled radially outwardly at its upper end, as shown.

The housing 24 includes a plurality of substantially radial bores 30, there being as many bores 30 as there are conduits 18 and each conduit 18 is fitted into a bore 30.

The core is rotatably seated concentrically in a support plug 32, the latter in turn being threaded into the housing 24, as shown. To provide for vertical play of the core with respect to the bores 30, thereby to allow for thermal expansion and contraction as well as to enable easy registry of 28 with the various bores 30, a Belleville spring 34 or the like is interposed between the head of the core and its supporting nut.

In order properly to space the valve vertically, as well as to supply the additional skin-strength needed in the region of the opening 23, a doubler plate 36 may be provided between the valve body and the skin-inside and riveted to both.

A screwdriver slot 50 is provided in the valve core to enable same to be rotated by means of a screwdriver to effect successive registration of bore 28 with successive bores 30, so as to enable draining of all the low spots in the tank in succession.

The lower end of the core's bore 28 is threaded as shown to occasionally engage an external drain pipe 38 from which the water or other liquid is fed into a waste-container, not shown, when the aircraft is grounded.

If the hydrostatic "head" of the liquid in the tank is "high" enough, gravity actuation will drain the tank when the core and pipe 38 are interconnected. However, to meet the contingency that this head may not be sufficient, a Y arm 39 is provided on the pipe 38 and to this arm air under pressure may be so applied as to cause it to serve as an aspirator. An air pump may be employed for this purpose.

When the draining operation is completed, the plug is turned to a position in which the radial section of bore 28 faces a blank wall between two bores 30, thus effectively closing the valve.

In FIG. 3 there is shown a further development of the present concepts in which, in lieu of the screwdriver mode of rotating the core, same is successively registered manually with the various conduits 30 by means of an indexing construction, not shown.

To this end, the opening 23B is made large enough to permit the insertion of a human hand and the lowermost end of the core 26 bears a knurled disk 70. On the lower circular face of 70 a series of numerals, say 1–12 inclusive, not shown, is circumferentially arranged. Each numeral designates a discrete one of the conduits 18, assuming that there are twelve such conduits. When the disk is manually turned to register a numeral with an index mark, not shown, the numbered conduit is registered with the valve by means of the coincidence of the respective one of the bores 30 with the bore 23. Thus all the low spots can be fully drained in any desired order. As in the form of FIG. 2, there is a zero position in which the valve is closed to prevent any drainage.

As a safety measure, this species also includes a screwdriver slot 50, as, and for the purposes, previously described.

A fastenable, fluid tight door 60 is preferably provided, as, and for the purposes, shown.

Although certain specific shapes, etc., have been shown or described, it is to be understood that the actual scope of the invention is limited only by the ambit of the subjoined claims, and that the invention resides in the entities defined by these claims, rather than in the aforedescribed details.

We claim:

1. In an aircraft: a structural framework integrally defining a liquid-container having a lower interior face; a plurality of low spots or depressed areas on said face; a conduit leading onwardly from each of said spots; an outlet opening in a wall of said container; and indexable flow-controlling means mounted in said opening and communicable with said conduits, said means being selectively registrable with each of said conduits to enable successive draining through said flow-controlling means of all said low spots; said outlet-flow controlling means comprising a valve-housing mounted in said opening; a valve core mounted rotatably and concentrically in the housing; a plurality of substantially radially extending passageways in the housing each communicating at its outer end with a conduit; a substantially central passageway in said core having a portion communicable successively with the inner end of each of said radially extending passageways; and an indexed actuator on the lower end of said core for rotating said core so as to successively register the core's passageway with successively indexable ones of said radially extending passageways.

2. In an aircraft integral fuel tank: a wall having a plurality of low spots in which water accumulates in the same wall that includes said low spots; an outlet opening in the tank; an outlet flow-controlling valve in said opening; a plurality of conduits each leading from said valve to a discrete low spot; a suction head on the outer end of each conduit; indexable means for selectively connecting the valve to each of said conduits; and means combined with the valve for creating an outflow causing air-pressure differential between each low spot and the air pressure in the valve whereby to enable draining of said container through said outlet opening.

3. A drain system comprising, in combination an aircraft fuel tank having protuberances on an interior lower face, said tank having low spots between said protuberances which trap water and other impurities, comprising: an opening in the same interior face that includes said low spots; a valve body mounted in said opening; a plurality of drain passages in said body; a conduit flow-connected to each of said passages and leading to a selected one of said low spots; a bore in said body; a valve core movably mounted in said bore for selective positioning; means for moving said core into selective positions; and a port in said valve core movable therewith selectively into registry with said drain passages and flow connected to the exterior of said valve body to selectively drain said "low" spots.

4. In an aircraft, a container having a lower interior face on which there are a plurality of liquid trapping regions; an outlet opening in a wall of said container at a point lower than the maximum level of liquid in the container; flow controlling means mounted fluid-tightly at the prepihery of said opening and controlling fluid flow therethrough, said flow controlling means including a plurality of passageways leading from the interior of the container and a single outlet leading to the exterior of the container, the single outlet being selectively registerable with each of the passageways; and conduit means flow connecting each of the liquid trapping regions with one of the plurality of passageways in the flow controlling means whereby the liquid trapped in said regions can be selectively drained therefrom.

5. The container as defined in claim 4 wherein said opening and flow controlling means are disposed at a level lower than all the liquid trapping regions whereby liquid may be drained therefrom regardless of the liquid level in the container.

6. A drain system for draining fluids from a container, comprising: a container having a lower interior face incorporating low spots thereon that normally entrap portions of the fluid contents of the container and having an opening in said lower interior face; a substantially hollow valve header mounted at said opening; a plurality of openings through said header into the container; a plurality of fluid conductors each being respectively connected at one end to one of the openings in the header and terminating in flow communication with one of said low spots; a rotatable valve core in the header for controlling the fluid flow therethrough, said valve core having a port therethrough with an inlet selectively registrable, by rotation of the core, with any one of the openings in the valve header and an outlet to the exterior of the container whereby fluid can be drained from each and all of the low spots.

References Cited in the file of this patent
UNITED STATES PATENTS

| | | |
|---|---|---|
| 133,950 | Paullin | Dec. 17, 1872 |
| 210,055 | Sanders | Nov. 19, 1878 |
| 2,252,185 | Kluse | Aug. 12, 1941 |
| 2,482,167 | Gilmont | Sept. 20, 1949 |